(12) United States Patent
Behnen et al.

(10) Patent No.: US 8,620,924 B2
(45) Date of Patent: Dec. 31, 2013

(54) REFRESHING A FULL-TEXT SEARCH INDEX IN A PARTITIONED DATABASE

(75) Inventors: Marion Behnen, Austin, TX (US); Shantanu S. Mundkur, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/413,399

(22) Filed: Mar. 6, 2012

(65) Prior Publication Data
US 2013/0238628 A1    Sep. 12, 2013

(51) Int. Cl.
*G06F 17/30* (2006.01)

(52) U.S. Cl.
USPC .......................................... 707/741; 707/968

(58) Field of Classification Search
None
See application file for complete search history.

(56) References Cited

U.S. PATENT DOCUMENTS

| | | |
|---|---|---|
| 7,290,214 B2 | 10/2007 | Sidle et al. |
| 7,769,732 B2 | 8/2010 | Cox et al. |
| 7,890,497 B2 | 2/2011 | Folkert et al. |
| 7,890,508 B2 | 2/2011 | Gerber et al. |
| 7,912,834 B2 | 3/2011 | Gupta et al. |
| 7,962,446 B2 | 6/2011 | Subramaniam et al. |
| 2006/0047622 A1 | 3/2006 | Folkert et al. |
| 2010/0082630 A1 | 4/2010 | Zagelow et al. |
| 2010/0332513 A1 | 12/2010 | Azar et al. |
| 2011/0106790 A1 | 5/2011 | Gupta et al. |
| 2011/0137886 A1 | 6/2011 | Wen et al. |
| 2012/0143873 A1* | 6/2012 | Saadat .......................... 707/741 |

OTHER PUBLICATIONS

Cambazoglu, B.B., F.P. Junqueira, V. Plachouras, S. Banachowski, B. Cui, S. Lim, and B. Bridge, "A Refreshing Perspective of Search Engine Caching", ACM World Web Wide Conference Committee (IW3C2), Raleigh, NC, USA, Apr. 26-30, 2010, Total 10 pp. [Also pp. 181-190].

Folkert, N., A. Gupta, A. Witkowski, S. Subramanian, S. Bellamkonda, S. Shankar, T. Bozkaya, and L. Sheng, "Optimizing Refresh of a Set of Materialized Views", Proceedings of the 31st VLDB Conference, ACM Trondheim, Noeway 2005, Total 12 pp. [Also pp. 1043-1054].

* cited by examiner

*Primary Examiner* — Pierre Vital
*Assistant Examiner* — David T Brooks
(74) *Attorney, Agent, or Firm* — Janaki K. Davda; Konrad, Raynes, Davda & Victor LLP

(57) ABSTRACT

A full-text search index for a table stored in a set of partitions of a database is refreshed. At a first point in time, table row distribution information and a table partitioning list are captured. At a second point in time, it is determined that an index refresh operation is to be performed. The captured table row distribution information is compared with current table row distribution information to determine whether there is at least one difference. In response to the determining that there is at least one difference, a text index distribution is re-aligned for any table rows that are affected by the change in table data row distribution by: generating a new table partitioning list, and indexing documents associated with table data rows that moved from one partition in the captured table partitioning list to another partition in the new table partitioning list.

15 Claims, 11 Drawing Sheets

FIG. 8

REFRESHING A FULL-TEXT SEARCH INDEX IN A PARTITIONED DATABASE

BACKGROUND

Embodiments of the invention relate to refreshing a full-text search index in a partitioned database.

Efficient searching of textual data is useful in database systems that store structured, semi-structured, and unstructured data. Full-text search indexing and full-text search are used to search out relevant information stored in the database. A full-text search index may be described as a list of search terms that is built by scanning the text of all the documents. A full-text search uses the full-text search index to try to match search criteria in a search request provided by a user. To minimize impact on transactions in the database, when the data source changes, maintenance of a full-text search index is generally done via index update and refresh operations that are separate from the operation that modifies the data source.

Large data volumes and heavy workloads lead to an increased use of partitioning database environments that involve splitting a database into multiple logical or physical partitions to provide a scalable solution.

Multi-partition database tables can be located in one or more partitions of the database, with data distributed based on a hashing function. In such partitioned tables (i.e., table partitions), some of the table data rows are stored in one partition, while other table data rows are stored in other partitions.

A partitioned table (i.e., a data source) might host multiple, independently managed, text search indexes to facilitate full-text search. For each of the text search indexes, a full-text search indexing system may index the data in a single text search index that contains the data for all partitions or, alternatively, use distinct, physical full-text search indexes on separate partitions that are then logically combined to give a unified view of the system.

A change in the number of partitions used by the data source may result in redistribution of the table data rows changing the partitions in which the table data rows are stored.

A non-partitioned full-text search index that does not include partition information is not impacted by such a data redistribution. However, such an index may have increased search times due to missing selectivity and may have longer index update times on the single index because of reduced parallelization opportunities and longer-running, more frequent merge operations.

To improve selectivity, appropriate partitioning metadata may be kept in the text index. Alternatively, to provide parallelization opportunities for increased performance and scalability, the text index may be split into multiple text index partitions that match the data table partitioning.

In this case, the partitioning metadata will have to be updated after a redistribution of table rows. If this type of a change is not accounted for, a query may return invalid search results because the full-text search index for the table data rows on a partition contains incorrect information about (1) rows that have moved to a different partition or (2) rows that were moved to that partition from another partition.

One approach is to mark the full-text search index invalid whenever a base table has its data redistributed after a change in the number of partitions. A user might either be notified immediately or the next time the full-text search index is referenced that a refresh of the full-text search index is required.

Another approach to ensure consistency is to enforce that operations that affect the data distribution in a multi-partition database can only proceed if they include a refresh of the text search index.

SUMMARY

Provided are a computer implemented method, computer program product, and system for refreshing a full-text search index for a table stored in a set of partitions of a database, wherein a portion of the table is stored in each of the partitions. At a first point in time, table row distribution information and a table partitioning list are captured. At a second point in time, it is determined that an index refresh operation is to be performed due to a change in table data row distribution. The captured table row distribution information is compared with current table row distribution information to determine whether there is at least one difference. In response to the determining that there is at least one difference, a text index distribution is re-aligned for any table rows that are affected by the change in table data row distribution by: generating a new table partitioning list that the full-text search index is to be distributed over, and indexing documents associated with table data rows that moved from one partition in the captured table partitioning list to another partition in the new table partitioning list.

BRIEF DESCRIPTION OF THE SEVERAL VIEWS OF THE DRAWINGS

In the drawings, like reference numbers represent corresponding parts throughout.

FIG. 7 is formed by FIGS. 7A and 7B.

FIG. 8 illustrates, in a block diagram, a distribution map before a sixth partition (P5) is added in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Redistribution of data rows usually does not affect every row in a table. In some cases, a large number of table rows in the table may not be impacted. Thus, embodiments identify the impacted table rows to minimize processing time and resource usage for a refresh operation, especially for large sets of data, where recreating full-text search index partitions may not be a feasible option for a required level of service.

Figure 1:
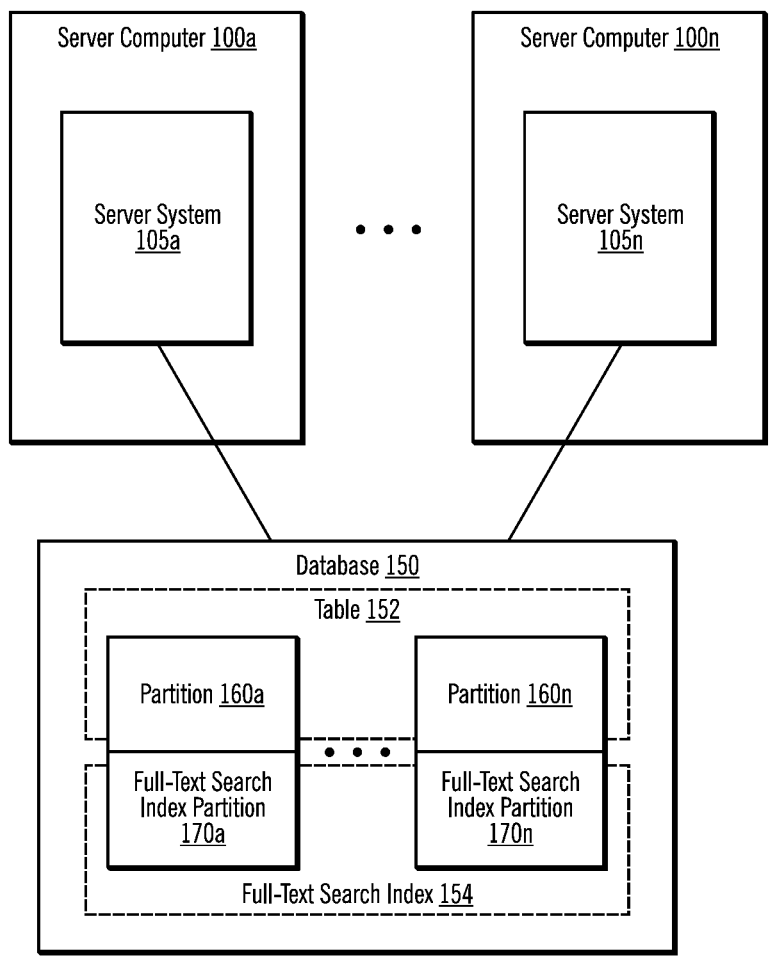
FIG. 1 illustrates, in a block diagram, a computing environment in accordance with certain embodiments.
Figure 2:
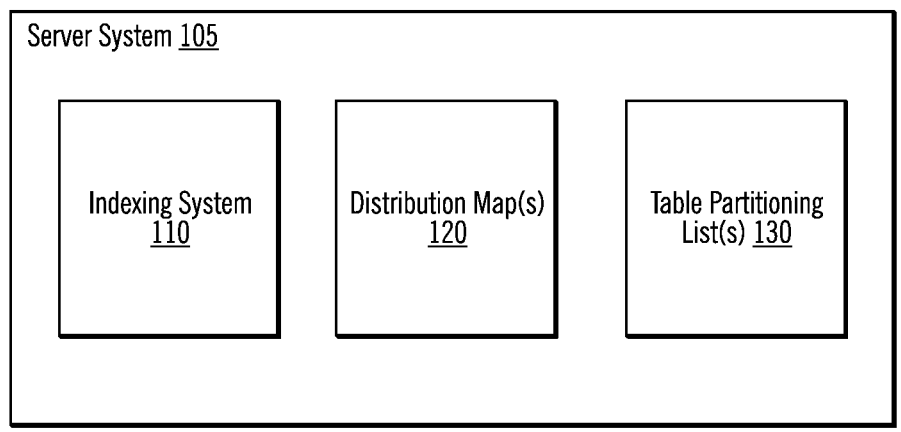
FIG. 2 illustrates further details of a server system in accordance with certain embodiments.

FIG. 1 illustrates, in a block diagram, a computing environment in accordance with certain embodiments. One or more server computers 100a . . . 100n each host a server system 105a . . . 105n that is coupled to a database 150. FIG. 2 illustrates further details of a server system 105a . . . 105n in accordance with certain embodiments. Each server system 105 includes an indexing system 110, one or more table distribution maps 120, and one or more table partitioning lists 130. A table partitioning list 130 may also be referred to as a set of partitions.

The database 150 is partitioned into partitions 160a . . . 160n. The table data rows of table 152 are stored in the partitions 160a . . . 160n.

The data in the table 152 in the partitioned database 150 is distributed over partitions 160a . . . 160n depending on a hashing function. The table 152 is managed as a logical whole, even while the table rows may be distributed in the distinct partitions 160a . . . 160n. Distribution keys are specified for the table data rows in order to distribute the table data rows.

A distribution map 120 is used with a hashing function to specify the mapping of distribution key values to partitions 160a . . . 160n, which then determines the placement and retrieval of each table data row. The one or more distribution maps 120 are updateable (i.e., they may be modified). At any time, the distribution map 120 provides the location (i.e., partition 160a . . . 160n) of any table data row.

Table 152 has at least one associated full-text search index 154. Each partition 160a . . . 160n has an associated full-text search index partition 170a . . . 170n containing text index data for the table data rows in the associated partition 160a . . . 160n for localized data access that in totality constitute the full-text search index 154.

To maintain the validity and consistency of a partitioned full-text search index 154, the indexing system 110 captures the table distribution map 120 and a table partitioning list 130 that exist when the full-text search index partitions 170a . . . 170n are created.

The indexing system 110 determines changes to the table distribution and updates or refreshes the full-text search index partitions 170a . . . 170n by evaluating distribution map 120 and table partitioning list 130 after partitions 160a . . . 160n are added to, or deleted from, partitions 160a . . . 160n to process the index refresh operation after a table data redistribution.

Thus, the actual impact of the data movement on the full-text search index partitions 170a . . . 170n is reduced to a subset of the complete table data rows stored in the table. With embodiments, the indexing system 110 avoids re-indexing the table data rows that remain static. With embodiments, the overall time taken for refreshing the full-text search index partitions 170a . . . 170n is the time for readjusting the index structure and identifying and indexing the affected subset of the table data rows on the new set of one or more partitions 160a . . . 160n and the time taken to delete index entries from the original partitions 160a . . . 160n.

Figure 3:
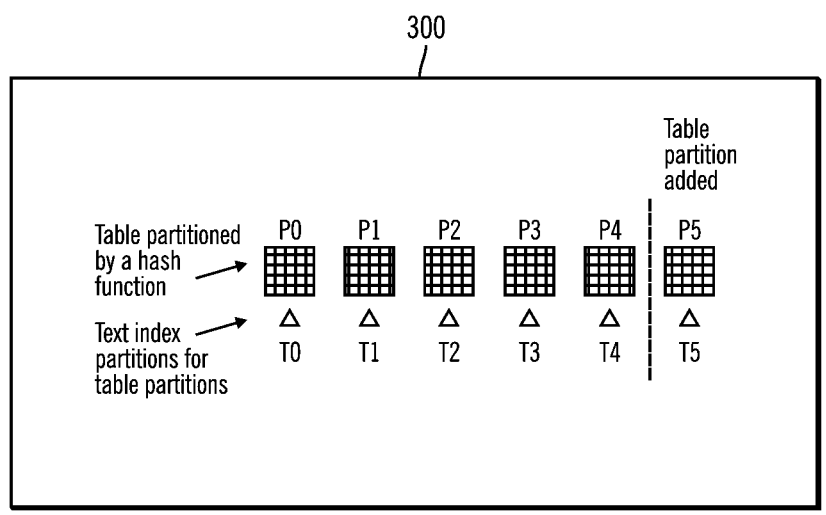
FIG. 3 illustrates, in a block diagram, a set of partitions in accordance with certain embodiments.

FIG. 3 illustrates, in a block diagram, a set of partitions 300 in accordance with certain embodiments. In particular, FIG. 3 presents a table partitioned by a hash function. There are initially five table partitions: P0, P1, P2, P3, and P4. A physically partitioned full-text search index is created with a partition for each table partition: T0, T1, T2, T3, and T4. A new table partition P5 is added as the table data grows. A new full-text search index partition T5 is also added to correspond to the table data rows that are to be located on the table partition P5 after data redistribution.

Figure 4:
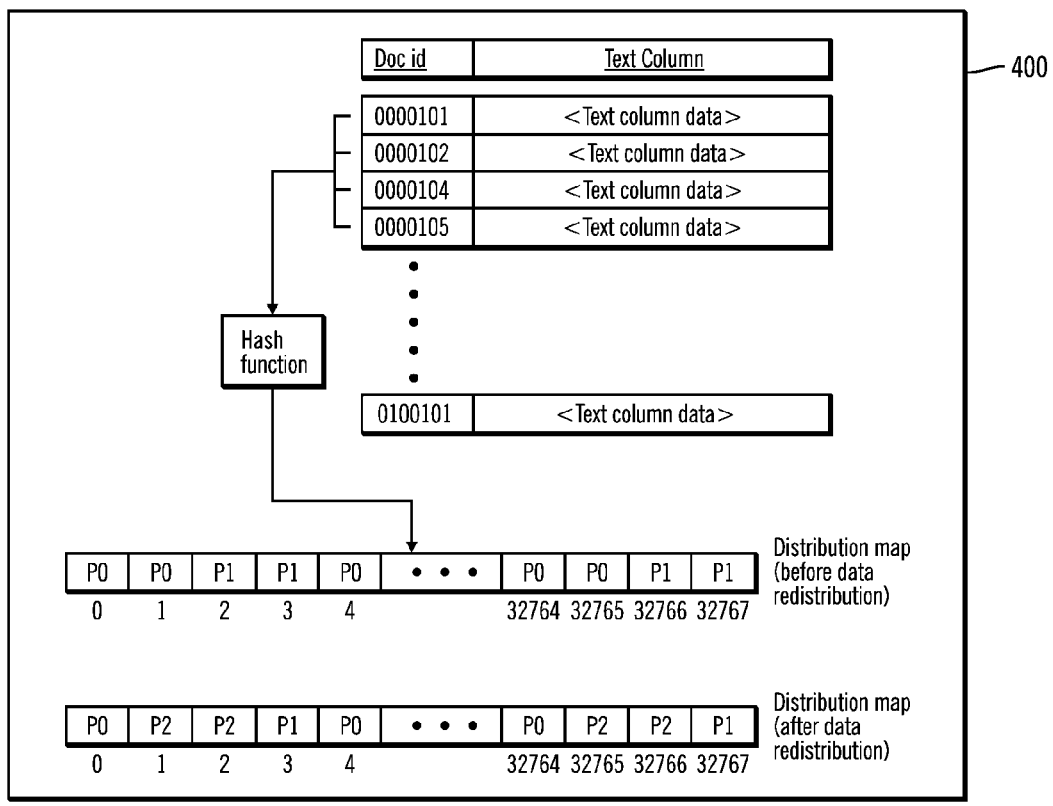
FIG. 4 illustrates, in a block diagram, a table with textual table data rows and the effects of data redistribution in accordance with certain embodiments.

FIG. 4 illustrates, in a block diagram, a table 400 with textual table data rows and the effects of data redistribution in accordance with certain embodiments. In this example, the distribution key for partitioning is the document identifier ("Doc id"). The hash function returns an index to the distribution map 120 with a size of 32768 in this example. The indexed value is the partition of the corresponding table data row in the table. For example, when the table is distributed over two partitions, P0 and P1, the hash function operations on Doc id 0000104 and returns 32765, which corresponds to partition P0. Partition P0 is therefore the location of the table data row. When the database grows in size, and the user adds a partition P2, the table data rows are redistributed to take advantage of the added partition P2. This results in a change to the distribution map 120 and movement of table data rows. With the added partition P2, Doc id 0000104 is located on partition P2 as the index 32765 maps to value P2. In the example, only a few rows are shown for brevity. Here, only the rows with document identifiers that index to 1, 2, 32765, 32766 change the partition they are located on. The rest of the table data rows (identified in FIG. 4) remain where they were originally stored. The indexing system 110 differentiates table data rows that are to be relocated from those that did not move. Thus, fewer changes are required to refresh the full-text search index.

Figure 5:
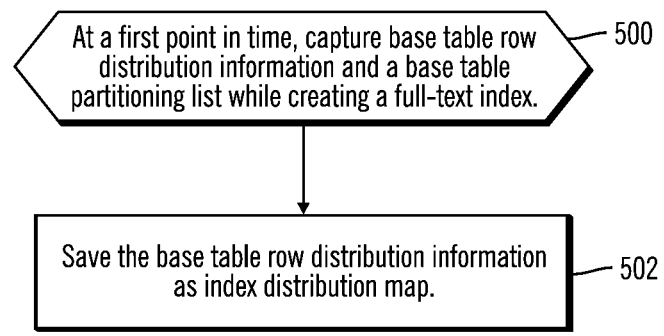
FIG. 5 illustrates, in a flow diagram, operations performed by an indexing system to create an index distribution map in accordance with certain embodiments.

FIG. 5 illustrates, in a flow diagram, operations performed by the indexing system 110 to create an index distribution map in accordance with certain embodiments. Control begins at block 500, at a first point in time, with the indexing system 110 capturing the base table row distribution information and base table partitioning list 130 while creating the full-text index 154. In block 502, the indexing system 110 saves the base table row distribution information as an index distribution map. The table partitioning list 130 is created when a table space is created and the partitions 160a . . . 160n that the table space will utilize are chosen. The distribution map 120 is created when a table is created and is updated when partitions 160a . . . 160n are added or deleted. The distribution map 120 may be referred to as pmap-tbl. The table partitioning and row distribution information may be saved as metadata.

In certain embodiments, the indexing system 110 stores a copy of the distribution pmap-tbl as pmap-idx and the set of partitions 160a . . . 160n as plist-idx. The indexing system 110 may store pmap-idx as a bitmap. The pmap-idx and plist-idx represent the before snapshot for the distribution for the full-text search index 154.

Figure 6:
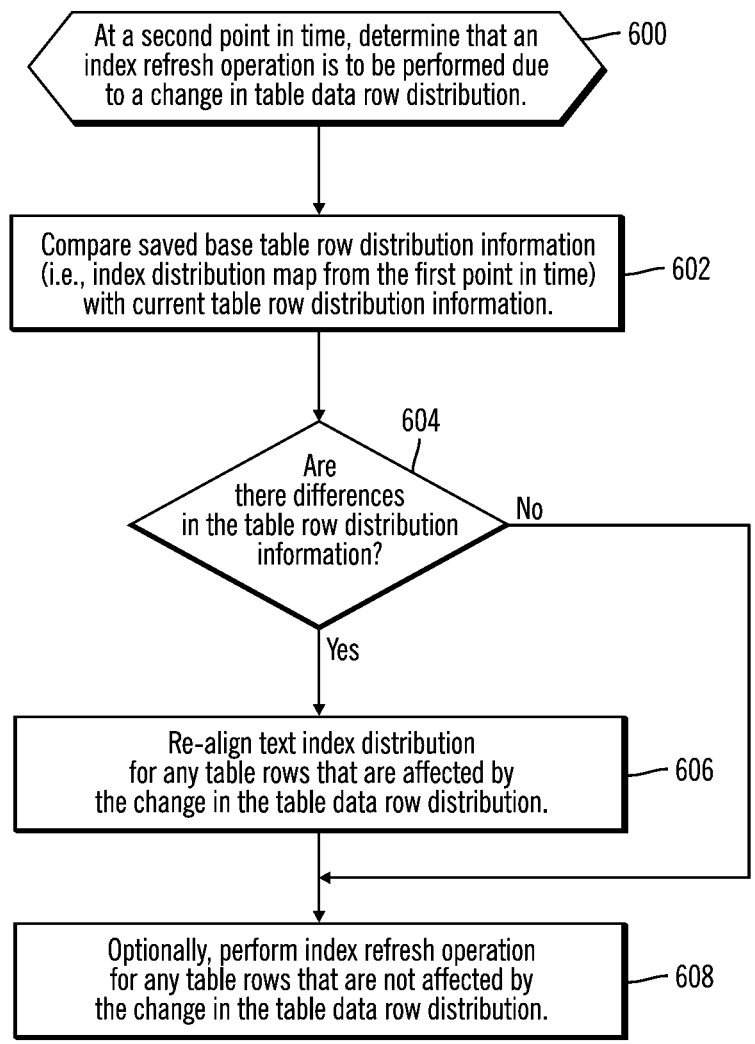
FIG. 6 illustrates, in a flow diagram, operations performed by an indexing system to detect that an index refresh operation is to be performed and operations to re-align a text index distribution with a table row distribution in accordance with certain embodiments.

FIG. 6 illustrates, in a flow diagram, operations performed by an indexing system to detect whether an index refresh operation is to be performed and operations to re-align a text index distribution with a table row distribution in accordance with certain embodiments. Control begins at block 600, at a second point in time, with the indexing system 110 determining that an index refresh operation is to be performed due to a change in table data row distribution. In block 602, the indexing system 110 compares the saved table row distribution information (i.e., index distribution map saved in block 502 of FIG. 5 at the first point in time) with current table row distribution information. In block 604, the indexing system 110 determines whether there are differences in the table row distribution information. This may be due to a partition 160*a* ... 160*n* being added to or dropped from the set of partitions 160*a* ... 160*n*. In various embodiments, the indexing system 110 compares the set of partitions 160*a* ... 160*n* (which is the current table partitioning list) with plist-idx (which is the copy of the previous table partitioning list) and the pmap-tbl (which is the current distribution map) to the pmap-idx (which is a copy of a previous distribution map) and determines whether a re-alignment of the text index distribution is to be performed due to redistribution of the table 152.

If there are differences, processing continues to block 606, otherwise, processing continues to block 608. In block 606, the indexing system 110 re-aligns the text index distribution for any table rows that are affected by the change in the table data row distribution (i.e., that are affected by the redistribution). In block 608, the indexing system 110, optionally, performs an index refresh operation for any table rows that are not affected by the change in the table data row distribution.

Figure 7A:
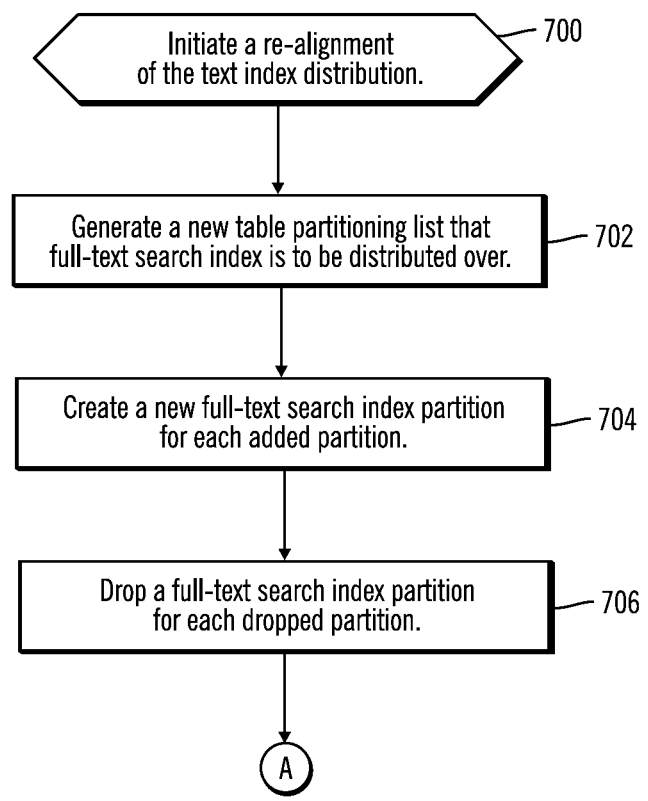
FIG. 7 illustrates, in a flow diagram, operations performed by an indexing system to determine a change in the table distribution and to perform index refresh operations in accordance with certain embodiments.
Figure 7B:
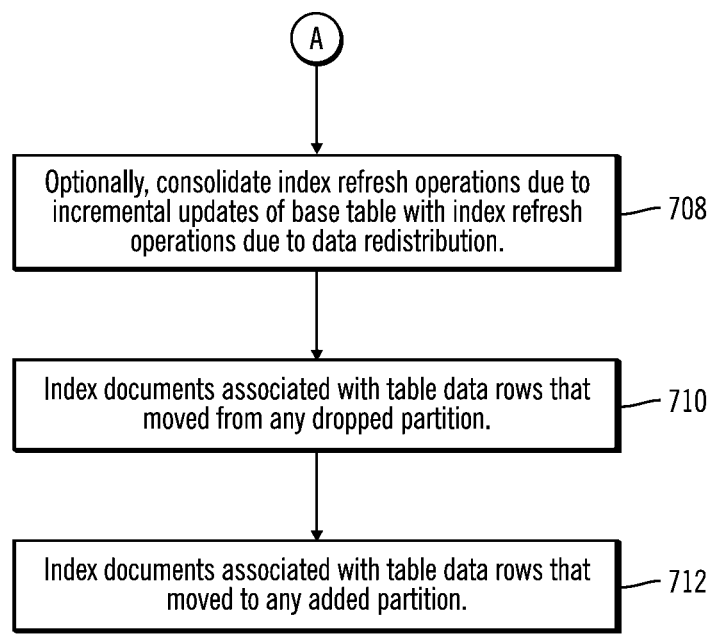

FIG. 7 illustrates, in a flow diagram, operations performed by an indexing system to determine a change in the table distribution and to perform index refresh operations in accordance with certain embodiments. FIG. 7 is formed by FIGS. 7A and 7B. Control begins at block 700 with the indexing system 110 initiating a re-alignment of the text index distribution. In block 702, the indexing system 110 generates a new table partitioning list 130 that the full-text search index 154 is to be distributed over. In certain embodiments, the current table partitioning list 130 storing the table 152 (referred to as plist-tbl) provides the new table partitioning list 130. The indexing system 110 compares the table partitioning list 130 used for the existing full-text search index 154 (referred to as plist-idx) with the table partitioning list 130 used to store the table 152 (referred to as plist-tbl) to generate a list of added (plist-A) partitions 160*a* ... 160*n* and a list of dropped (plist-D) partitions 160*a* ... 160*n*.

In block 704, the indexing system 110 creates a new full-text search index partition 170*a* ... 170*n* for each added partition 160*a* ... 160*n*. In particular, plist-A is used to create the corresponding full-text search index partitions 170*a* ... 170*n*. These full-text search index partitions 170*a* ... 170*n* are initially empty and are populated later during the index refresh operation. In block 706, the indexing system 110 drops a full-text search index partition 170*a* ... 170*n* for each dropped partition 160*a* ... 160*n*. In particular, plist-D is used to drop the full-text search index partitions 170*a* ... 170*n* that are no longer used. This accomplishes the action of altering the physical index based on the new distribution. The documents indexed by the dropped partitions 160*a* ... 160*n* are re-indexed depending on the new partition 160*a* ... 160*n* the respective table data row moved to during data redistribution. This is accomplished in the index refresh operation.

In block 708, the indexing system 110, optionally, consolidates index refresh operations due to incremental updates of the base table 152 with index refresh operations due to data redistribution. Incremental updates of the base table 152 in these embodiments are identified through a logging mechanism that identifies the rows in the base table that were inserted, updated or deleted since the last incremental update.

Next, the indexing system 110 performs an index refresh operation based on the changed distribution by operating on a subset of the table data rows that are to be moved among the remaining partitions 160*a* ... 160*n*. In block 710, the indexing system 110 indexes documents associated with table data rows that moved from any dropped partition 160*a* ... 160*n*.

In particular, the indexing system 110 deletes the documents from plist-A from the old full-text search index partitions 170*a* ... 170*n*. This is equivalent to running a delete for the respective table data row on its associated full-text search index partition 170*a* ... 170*n* according to pmap-idx. Each document is indexed on only one of the partitions 160*a* ... 160*n*, and so the delete operation is not applicable on other partitions 160*a* ... 160*n* where the document would not have been indexed. This achieves removal of the documents from the old partitions 160*a* ... 160*n* where the documents used to reside. Optionally, the indexing system 110 may drop the full-text search index partitions 170*a* ... 170*n* as determined by plist-D before starting to delete documents to reduce the time spent deleting documents on partitions 160*a* ... 160*n* that are to be dropped. Thus, the indexing system 110 removes index data associated with table data rows that are deleted from partitions 160*a* ... 160*n*.

In block 712, the indexing system 110 indexes documents associated with table data rows that moved to any added partition 160*a* ... 160*n*. In particular, the indexing system 110 indexes documents associated with table data rows that moved from a dropped partition 160*a* ... 160*n*, plist-D, to new partitions 160*a* ... 160*n*, according to a comparison of pmap-idx and pmap tbl. The indexing system 110 determines which table data rows are to be moved by using pmap-idx and generating a list, hvlist, of the map index values (hashed values) corresponding to the dropped partition numbers. The hashed value is used as a predicate to fetch documents from the table 152 and treated as an insert operation on each of the partitions 160*a* ... 160*n* where they are found. This ends up adding (indexing) the documents for the new target partitions 160*a* ... 160*n*.

This technique for refreshing the full-text search index 154 avoids re-indexing the documents from the table data rows that did not change from one partition 160*a* ... 160*n* to another partition 160*a* ... 160*n*.

Figure 8:
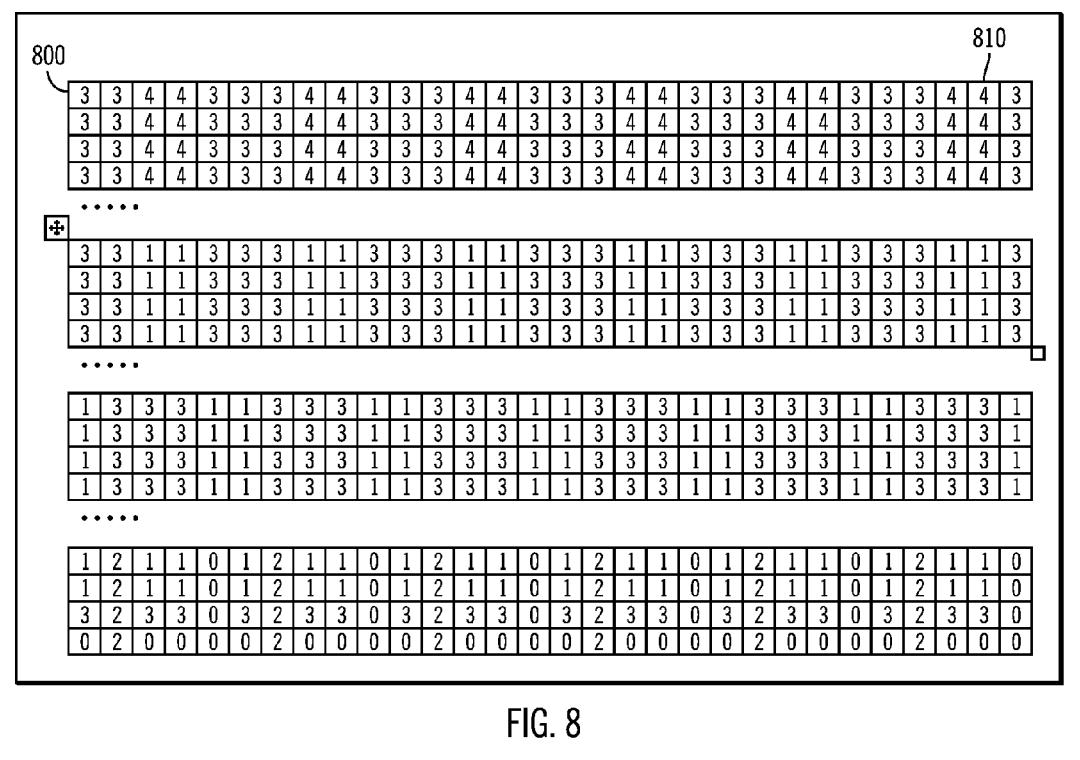

FIG. 8 illustrates, in a block diagram, a distribution map 120 before a sixth partition (P5) is added in accordance with certain embodiments. Each table data row has a distribution key, and a hash function uses that distribution key to locate a slot in the distribution map. The slot in the distribution map indicates the partition storing the table data row.

Figure 9:
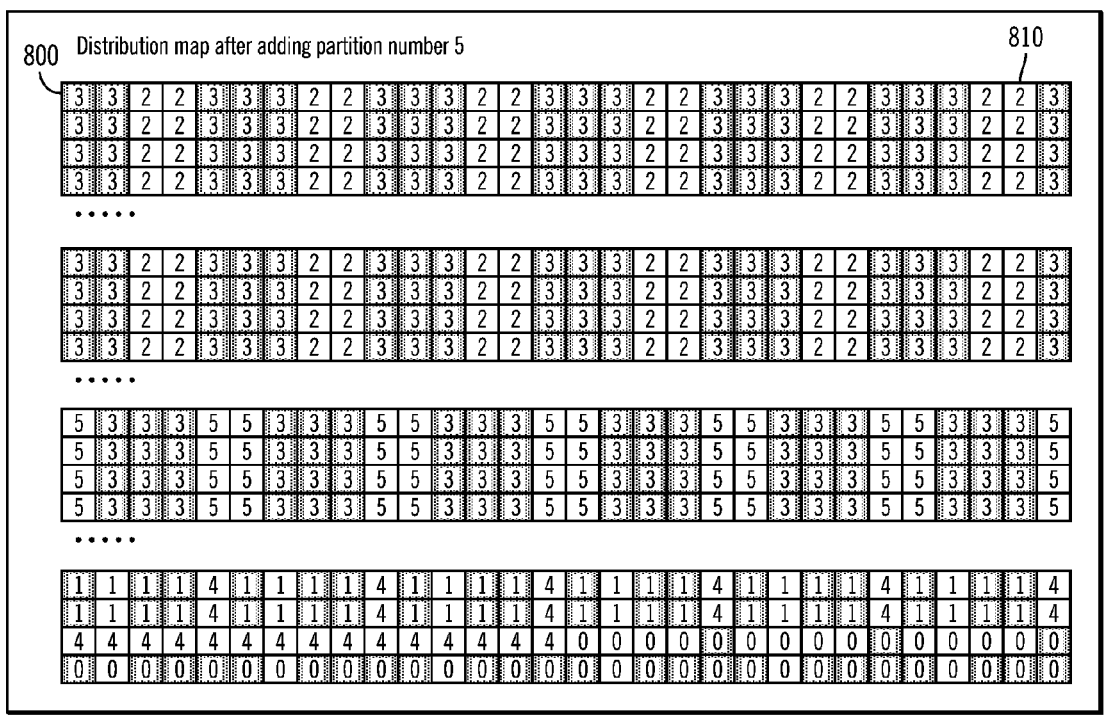
FIG. 9 illustrates, in a block diagram, a distribution map after the sixth partition (P5) is added) in accordance with certain embodiments.

FIG. 9 illustrates, in a block diagram, a distribution map 120 after the sixth partition (P5) is added) in accordance with certain embodiments. In FIGS. 8 and 9, slot 800 identifies partition 3, which indicates that the table data row associated with this slot did not move from one partition to another partition. Also, in FIG. 8, slot 810 identifies partition 4, while in FIG. 9, slot 810 identifies partition 2, which indicates that the table data row associated with this slot moved from partition 4 to partition 2.

Thus, the indexing system 110 can identify and apply changes due to a redistribution of data rows in a partitioned database table onto a partitioned text index even if the text index is managed independently outside the database.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5, 6, and 7 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 10:
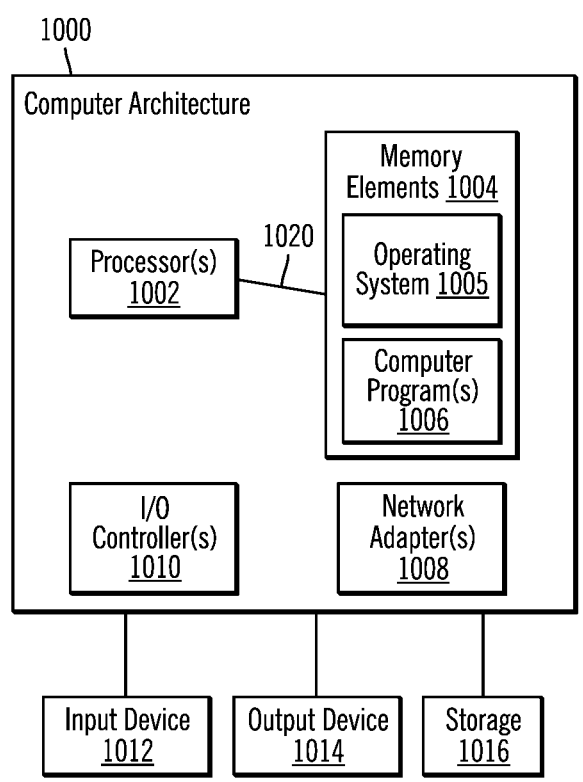
FIG. 10 illustrates, in a block diagram, a computer architecture that may be used in accordance with certain embodiments.

FIG. 10 illustrates a computer architecture 1000 that may be used in accordance with certain embodiments. Each server computer 100a . . . 100n may implement computer architecture 1000. The computer architecture 1000 is suitable for storing and/or executing program code and includes at least one processor 1002 coupled directly or indirectly to memory elements 1004 through a system bus 1020. The memory elements 1004 may include local memory employed during actual execution of the program code, bulk storage, and cache memories which provide temporary storage of at least some program code in order to reduce the number of times code must be retrieved from bulk storage during execution. The memory elements 1004 include an operating system 1005 and one or more computer programs 1006.

Input/Output (I/O) devices 1012, 1014 (including but not limited to keyboards, displays, pointing devices, etc.) may be coupled to the system either directly or through intervening I/O controllers 1010.

Network adapters 1008 may also be coupled to the system to enable the data processing system to become coupled to other data processing systems or remote printers or storage devices through intervening private or public networks. Modems, cable modem and Ethernet cards are just a few of the currently available types of network adapters 1008.

The computer architecture 1000 may be coupled to storage 1016 (e.g., any type of storage device; a non-volatile storage area, such as magnetic disk drives, optical disk drives, a tape drive, etc.). The storage 1016 may comprise an internal storage device or an attached or network accessible storage. Computer programs 1006 in storage 1016 may be loaded into the memory elements 1004 and executed by a processor 1002 in a manner known in the art.

The computer architecture 1000 may include fewer components than illustrated, additional components not illustrated herein, or some combination of the components illustrated and additional components. The computer architecture 1000 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for refreshing a full-text search index for a table stored in a set of partitions of a database, wherein a portion of the table is stored in each of the partitions, comprising:

at a first point in time, with a processor of a computer, capturing table row distribution information and a table partitioning list identifying the set of partitions, wherein the table row distribution information has a slot for each table row and indicates a partition in which the table row is stored; and at a second point in time,
in response to at least one of a partition being added and a partition being dropped from the set of partitions, moving table rows among the set of partitions to change table data row distribution; and updating the table row distribution information by updating the slot for each table row to indicate the partition in which the table row is stored;

determining that an index refresh operation is to be performed due to the change in the table data row distribution;

comparing the captured table row distribution information with current table row distribution information to determine whether there is at least one difference; and in response to the determining that there is at least one difference, re-aligning a text index distribution for any table rows that are affected by the change in the table data row distribution by:

generating a new table partitioning list that the full-text search index is to be distributed over; and indexing documents associated with the table rows that moved from one partition in the captured table partitioning list to another partition in the new table partitioning list, wherein the documents associated with the table rows that did not move from one partition in the captured table partitioning list to another partition in the new table partitioning list are not re-indexed.

2. The method of claim 1, wherein the set of partitions comprises a first set of partitions and further comprising:

identifying a change in partitions by comparing the captured table partitioning list with the new table partitioning list.

3. The method of claim 1, further comprising:

consolidating index refresh operations due to incremental updates of a base table with index refresh operations due to data redistribution.

4. The method of claim 1, further comprising:

creating a new full-text search index partition for each added partition.

5. The method of claim 1, further comprising:

dropping a full-text search index partition for each dropped partition.

6. A computer program product for refreshing a full-text search index for a table stored in a set of partitions of a database, wherein a portion of the table is stored in each of the partitions, the computer program product comprising:

a non-transitory computer readable storage medium having computer readable program code embodied therein, wherein the computer readable program code, when executed by a processor of a computer, is configured to perform operations of:

at a first point in time, with a processor of a computer, capturing table row distribution information and a table partitioning list identifying the set of partitions, wherein the table row distribution information has a slot for each table row and indicates a partition in which the table row is stored; and at a second point in time, in response to at least one of a partition being added and a partition being dropped from the set of partitions, moving table rows among the set of partitions to change table data row distribution; and updating the table row distribution information by updating the slot for each table row to indicate the partition in which the table row is stored;

determining that an index refresh operation is to be performed due to the change in the table data row distribution;

comparing the captured table row distribution information with current table row distribution information to determine whether there is at least one difference; and in response to the determining that there is at least one difference, re-aligning a text index distribution for any table rows that are affected by the change in the table data row distribution by:

generating a new table partitioning list that the full-text search index is to be distributed over; and indexing documents associated with the table rows that moved from one partition in the captured table partitioning list to another partition in the new table partitioning list, wherein the documents associated with the table rows that did not move from one partition in the captured table partitioning list to another partition in the new table partitioning list are not re-indexed.

7. The computer program product of claim 6, wherein the set of partitions comprises a first set of partitions and further comprising:

identifying a change in partitions by comparing the captured table partitioning list with the new table partitioning list.

8. The computer program product of claim 6, further comprising:

consolidating index refresh operations due to incremental updates of a base table with index refresh operations due to data redistribution.

9. The computer program product of claim 6, further comprising:

creating a new full-text search index partition for each added partition.

10. The computer program product of claim 6, further comprising:

dropping a full-text search index partition for each dropped partition.

11. A computer system for refreshing a full-text search index for a table stored in a set of partitions of a database, wherein a portion of the table is stored in each of the partitions, comprising:

a processor; and a storage device coupled to the processor, wherein the storage device has stored thereon a program, and wherein the processor is configured to execute instructions of the program to perform operations, wherein the operations comprise:

at a first point in time, with a processor of a computer, capturing table row distribution information and a table partitioning list identifying the set of partitions, wherein the table row distribution information has a slot for each table row and indicates a partition in which the table row is stored; and at a second point in time, in response to at least one of a partition being added and a partition being dropped from the set of partitions, moving table rows among the set of partitions to change table data row distribution; and updating the table row distribution information by updating the slot for each table row to indicate the partition in which the table row is stored;

determining that an index refresh operation is to be performed due to the change in the table data row distribution;

comparing the captured table row distribution information with current table row distribution information to determine whether there is at least one difference; and in response to the determining that there is at least one difference, re-aligning a text index distribution for any table rows that are affected by the change in the table data row distribution by:
generating a new table partitioning list that the full-text search index is to be distributed over; and
indexing documents associated with the table rows that moved from one partition in the captured table partitioning list to another partition in the new table partitioning list, wherein the documents associated with the table rows that did not move from one partition in the captured table partitioning list to another partition in the new table partitioning list are not re-indexed.

12. The computer system of claim 11, wherein the set of partitions comprises a first set of partitions and further comprising:
identifying a change in partitions by comparing the captured table partitioning list with the new table partitioning list.

13. The computer system of claim 11, further comprising: consolidating index refresh operations due to incremental updates of a base table with index refresh operations due to data redistribution.

14. The computer system of claim 11, further comprising: creating a new full-text search index partition for each added partition.

15. The computer system of claim 11, further comprising: dropping a full-text search index partition for each dropped partition.

* * * * *